Patented July 5, 1932

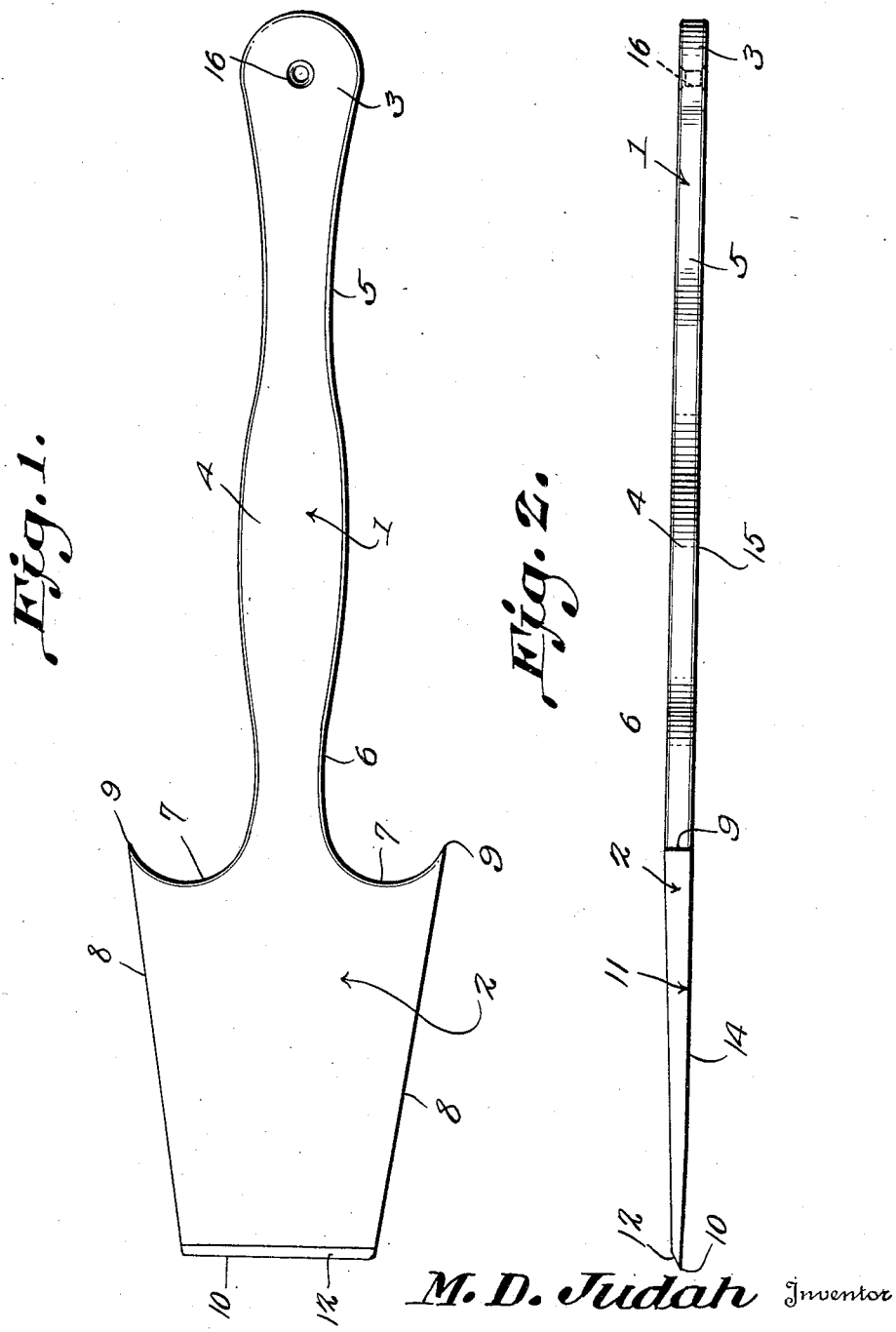

1,866,039

UNITED STATES PATENT OFFICE

MANSFIELD DOUGLAS JUDAH, OF LONG BEACH, CALIFORNIA

OVEN IMPLEMENT

Application filed November 4, 1931. Serial No. 573,028.

This invention aims to provide a simple device whereby a housewife can withdraw hot pans, pots and the like, from a kitchen oven, without running a chance of being burned, as is the case when an attempt is made to withdraw such articles through the instrumentality of a cloth. The invention aims to provide a one-piece, wooden article, for the purpose stated, made of oak, pine or any other suitable wood, the device being shorter and lighter than the ordinary baker's peel, and the article being so constructed that a slight thrust will introduce it underneath the article which is to be withdrawn from the oven, the article being thereby removed from the oven, with safety and dispatch. Another object of the invention is to provide a device of the class described which, although costing but a few cents, will be thoroughly efficient for the ends in view and be capable of withstanding long continued use.

It is within the province of the disclosure to improved generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:—

Figure 1 shows in top plan, a device constructed in accordance with the invention;

Figure 2 is a side elevation.

The device forming the subject matter of this application is adapted to be employed for removing hot articles from a domestic oven. It comprises a handle 1, of a common thickness from end to end, and a broadened blade 2 at one end of the handle. Because the handle 1 is of a common thickness from end to end, as shown in Figure 2, the article can be made cheaply out of a piece of board without doing any expensive lathe work, it being understood that the article is made of any suitable wood, such as oak, or pine. The handle 1 has a laterally enlarged portion 3 at its outer end, a laterally enlarged portion 4 intermediate its ends, an outer restricted portion 5 between the enlarged portions 3 and 4, and an inner restricted portion 6 between the inner enlarged portion 4 and the blade 2, and closely adjacent to the blade. The restricted portions 5 and 6 afford spaced hand grips, whereby the operator may take hold of the handle 1 conveniently, either near to the outer end of the handle, near to the blade, or at both of said places at once. The device is short enough so that it may be used as a kitchen article, and be put away conveniently, without standing it up endwise, or hanging it from a height approximating the height of the operator. In other words, the device is a kitchen article, as distinguished from a long baker's peel, which could not be used conveniently in an ordinary domestic kitchen.

The rear end of the blade 2 has pronounced concavities 7, located on opposite sides of the handle 1, and forming, at the outer lateral edges 8 of the blade, sharp-pointed hooks 9, to be used in moving an article in an oven, the said outer lateral edges 8 of the blade converging toward the forward end 10 of the blade, to make the hooks 9 efficient. The blade 2 tapers in thickness, in one direction only, from its inner end to its outer end, as shown at 11, and is bevelled in one direction, only, as shown at 12, to facilitate the introduction of the blade under the article which is to be removed from the oven. The under surface 14 of the blade 2, and the under surface 15 of the handle 1 lie in a common flat plane. In the part 3 of the handle 1 there is a hole 16 or other suspension means, whereby the device may be hung up when not in use, although it is short enough so that it can be laid away on a shelf, or on a table, without being in the way.

The structure is simple and inexpensive to make, and will be found thoroughly efficient for the objects stated.

What is claimed is:—

A device for removing hot articles from a domestic oven, comprising a handle of a common thickness from end to end and a broadened blade at one end of the handle, the device being made of wood, the handle having a laterally enlarged portion at its outer end, a laterally enlarged portion intermediate its ends, an outer restricted portion between the enlarged portions, and an inner restricted portion between the inner enlarged portion and the blade and closely adjacent to the blade, the restricted portions affording spaced hand grips whereby the operator may take hold of the handle conveniently either near to the outer end of the handle, near to the blade or at both of said places at once, the device being short enough so that it may be used as a kitchen article and be put away conveniently without standing it up endwise or hanging it from a height approximating the height of the operator, the rear end of the blade having pronounced concavities located on opposite sides of the handle, and forming, at the outer lateral edges of the blade, sharp-pointed hooks to be used in moving an article in an oven, the outer lateral edges of the blade converging toward the forward end of the blade to make the hooks efficient, the blade tapering in thickness from its inner end to its outer end and being bevelled across its outer end, to facilitate the introduction of the blade under the article which is to be removed from the oven.

In testimony that I claim the foregoing as my own, I have hereto affixed my signature.

MANSFIELD DOUGLAS JUDAH.